United States Patent
Kallenberg et al.

(10) Patent No.: US 11,238,160 B2
(45) Date of Patent: Feb. 1, 2022

(54) BOOT FIRMWARE SANDBOXING

(71) Applicant: Apple Inc., Cupertino, CA (US)

(72) Inventors: Corey T. Kallenberg, Los Gatos, CA (US); Rafal Wojtczuk, Warsaw (PL); Xeno S. Kovah, Milpitas, CA (US); Andrew J. Fish, Olympia, WA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 16/428,757

(22) Filed: May 31, 2019

(65) Prior Publication Data

US 2020/0104506 A1    Apr. 2, 2020

Related U.S. Application Data (60) Provisional application No. 62/739,103, filed on Sep. 28, 2018.

(51) Int. Cl.
  *G06F 21/57*  (2013.01)
  *G06F 13/28*  (2006.01)
  *G06F 21/53*  (2013.01)

(52) U.S. Cl.
  CPC ............ *G06F 21/575* (2013.01); *G06F 13/28* (2013.01); *G06F 21/53* (2013.01); *G06F 21/572* (2013.01)

(58) Field of Classification Search
  CPC ...... G06F 21/575; G06F 21/53; G06F 21/572; G06F 13/28
  See application file for complete search history.

(56) References Cited

U.S. PATENT DOCUMENTS

| | | | |
|---|---|---|---|
| 670,484 A | 3/1901 | Ruppel | |
| 6,425,079 B1 | 4/2002 | Mahmoud | |
| 6,598,159 B1 | 7/2003 | McAlister et al. | |
| 6,961,791 B2 | 11/2005 | Cepulis | |
| 7,120,778 B2 | 10/2006 | Zimmer | |
| 2003/0061497 A1* | 3/2003 | Zimmer | G06F 21/575 713/189 |
| 2004/0268135 A1* | 12/2004 | Zimmer | H04L 9/0825 713/189 |

(Continued)

OTHER PUBLICATIONS

International Search Report and Written Opinion in PCT Appl. No. PCT/US2019/051233 dated Nov. 27, 2019, 12 pages.

*Primary Examiner* — Gary Collins
(74) *Attorney, Agent, or Firm* — Kowert, Hood, Munyon, Rankin & Goetzel, P.C.

(57) ABSTRACT

Techniques are disclosed relating to securely booting a computer system. In some embodiments, a bootloader initiates a boot sequence to load an operating system of the computing device and detects firmware of a peripheral device to be executed during the boot process to initialize the peripheral device for use by the computing device. In response to the detecting, the bootloader instantiates a sandbox that isolates the firmware from the bootloader. In various embodiments, the firmware is loaded from an option read-only memory (OROM) included the peripheral device and executed during the boot sequence to initialize the peripheral device. In some embodiments, the bootloader assigns one or more memory address ranges to the firmware, and the sandbox restricts the firmware from accessing memory addresses that are not included in the assigned one or more address ranges.

20 Claims, 7 Drawing Sheets

(56) References Cited

U.S. PATENT DOCUMENTS

| | | | |
|---|---|---|---|
| 2005/0038981 A1* | 2/2005 | Connor | G06F 9/4411 |
| | | | 713/1 |
| 2007/0208883 A1* | 9/2007 | Bircher | G06F 9/4411 |
| | | | 710/8 |
| 2009/0063835 A1* | 3/2009 | Yao | G06F 9/45558 |
| | | | 713/2 |

* cited by examiner

BOOT FIRMWARE SANDBOXING

The present application claims priority to U.S. Prov. Appl. No. 62/739,103, filed Sep. 28, 2018, which is incorporated by reference herein in its entirety.

BACKGROUND

Technical Field

This disclosure relates generally to computer systems, and, more specifically, to system booting.

Description of the Related Art

When a computer system is powered on, it typically performs a boot sequence that includes executing a bootloader in order to eventually load the operating system. Before loading the operating system, the bootloader may initially perform a set of power-on self-tests in order to verify system hardware. The bootloader may also initiate execution of firmware to initialize system hardware. In some instances, this firmware may be installed by a manufacturer of the device during fabrication. In other instances, this firmware may be loaded from a read-only memory (ROM) provided by hardware, which may be installed in the system after fabrication. This type of firmware may be referred to as option ROM (OROM) firmware and used to initialize hardware such as graphics cards, small computer system interface (SCSI) devices, etc.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]— is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "graphics card configured to render content on a display" is intended to cover, for example, a card that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, a malicious actor may attempt to compromise a computing device during its boot sequence by causing the device to execute malicious OROM firmware. For example, malicious firmware may be installed in an OROM of a dongle that is plugged into the computing device prior to boot. When the computing device is initialized, the bootloader may retrieve the malicious firmware from the dongle's OROM and become compromised when it attempts to execute the firmware. To prevent such an exploit, a computing device may ban the execution of OROM firmware; however, this may prevent use of particular desired hardware. Alternatively, a computing device may require a user to perform a particular action (e.g., pressing particular sequence of characters on a keyboard) to authorize execution of OROM firmware; however, this may unduly burden the user and ruin the user experience. Furthermore, a malicious actor having access to the computing device can still potentially perform the particular action.

The present disclosure describes embodiments in which OROM firmware is sandboxed to prevent it from potentially compromising a computing device during boot. As will be described below in greater detail in various embodiments, a computing device can execute a bootloader to perform a boot sequence to load an operating system. (As used herein, the term "bootloader" is intended to be construed broadly in accordance with its understood meaning in the art and can refer to program instructions executed during a first boot stage to initialize hardware (e.g., a first-stage bootloader from an UEFI boot ROM) and/or program instructions executed during a second boot stage to load an operating system (e.g., a second-stage bootloader loaded from primary storage)). If the bootloader detects a peripheral device having firmware to be executed in the boot sequence in order to initialize the peripheral device, the bootloader can implement a sandbox to restrict execution of the firmware. In some embodiments discussed below, the sandbox can restrict the address ranges of memory that are accessible to the firmware such as preventing the firmware from accessing ranges of memory being used by the bootloader. In some embodiments, the sandbox also causes the firmware be executed in a restricted mode of execution (e.g., x86 Ring 3) in which the firmware executes with restricted privileges relative to those afforded to the bootloader, which executes in an unrestricted mode (e.g., x86 Ring 0). In some embodiments, the sandbox also restricts how the firmware interacts with the bootloader including restricting the requests that the firmware can make to the bootloader. For example, if the firmware requests performance of an inappropriate action using a particular protocol, the request may be denied, and execution of the firmware may be suspended/killed. In many instances, sandboxing firmware executed during boot can significantly reduce the possibility that malicious firmware can compromise the computing device. Sandboxing firmware also does not require the user to perform some special action or the firmware provider to implement some functionality.

Figure 1:
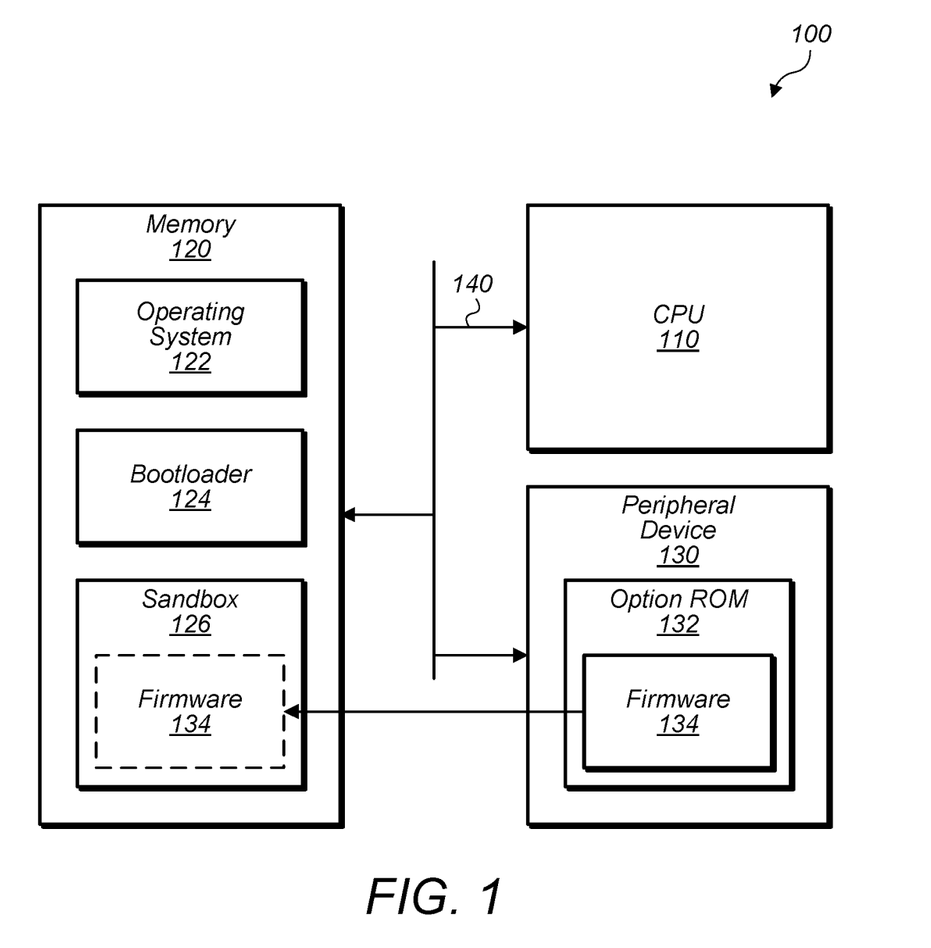
FIG. 1 is a block diagram illustrating an example of a computing device that implements a sandbox for firmware in an option ROM.

Turning now to FIG. 1, a block diagram of a computing device 100 is depicted. In the illustrated embodiment, device 100 includes a central processing unit (CPU) 110, memory 120, and a peripheral device 130 coupled together via an interconnect 140. Memory 120 includes an operating system (OS) 122, bootloader 124, and a sandbox 126. Peripheral device 130 includes an option read-only memory (OROM) 132, which includes firmware 134. In some embodiments, computing device 100 may be implemented differently than shown. For example, peripheral device 130 may be one of multiple devices 130, elements 122-126 may be located in separate memories, computing device 100 may include any of the additional components discussed below with respect to FIG. 5, etc.

Bootloader 124, in various embodiments, is executable to boot computing device 100 including loading OS 122. Accordingly, when computing device 100 is powered on, device 100 may initiate execution of bootloader 124 to perform a boot sequence for computing device 100. This boot sequence may include bootloader 124 initially performing various power-on self-tests (POSTs). Bootloader 124 may attempt to initialize various hardware such as peripheral device 130 discussed below. Bootloader 124 may then conclude the boot sequence with the loading of OS 122's kernel. In some embodiments, bootloader 124 may comply with specifications such as Basic Input/Output System (BIOS), Unified Extensible Firmware Interface (UEFI), etc.

Peripheral device 130, in various embodiments, is a hardware device that is initialized during a boot sequence performed by bootloader 124. Peripheral device 130 may correspond to any suitable hardware such as a graphics card, sound card, network interface card (NIC) (e.g., Wi-Fi™, Bluetooth®, cellular), storage device, keyboard, mouse, display, joystick, a biometric sensor (e.g., fingerprint sensor, retina sensor, facial-recognition sensor), a camera (e.g., visible light or infrared), a vehicle navigation system (or other electronic control unit (ECU) in a vehicle), Light Detection and Ranging (LIDAR) emitters and receivers, neural network engine, accelerometer, eye tracking sensor, hand tracking sensor, global positioning system (GPS) sensor, etc. In some embodiments, device 130 is a card configured to be inserted internally into computing device 100 and coupled via an interconnect, which may support, for example, a Peripheral Component Interconnect Express (PCIe)®. In some embodiments, device 130 is an external device, which may be coupled via Universal Serial Bus™ (USB), Thunderbolt™, etc.

In various embodiments, bootloader 124 may not possess sufficient capability to initialize peripheral device 130 and thus may rely on firmware 134 supplied by OROM 132 to initialize device 130. Although the term "option ROM" refers to a read-only memory, the term "option ROM" as described herein should not be limited to read-only memories; rather, this term can refer to other forms of non-volatile memories such as NAND flash memory, NOR flash memory, nano RAM (NRAM), or any of the other examples of memory mentioned below with respect to FIG. 5. In some embodiments, firmware 134 may reside in a memory separate from peripheral device 130. In various embodiments, firmware 134 includes one or more drivers executable to enable use of peripheral device 130. For example, if peripheral device 130 is a graphics card, firmware 134 may include a display driver executable to enable an application to request that the graphics card render content presented on a display of device 100. As noted above, however, execution of firmware 134 may allow a malicious actor to inject program instruction that can compromise device 100.

In various embodiments, however, bootloader 124 is executable to instantiate a sandbox 126 to isolate firmware 134. As will be discussed below with respect to FIG. 2, in some embodiments, sandbox 126 restricts what memory addresses can be accessed by firmware 134. In particular, bootloader 124 may allocate, to firmware 134, one or more address ranges of memory 120 (which may be allocated in the form of pages), and sandbox 126 may restrict firmware 134 to accessing addresses only within the allocated ranges. Accordingly, if firmware 134 attempts to access an address outside its allocated ranges, sandbox 126 may prevent the access and, in some embodiments, halt execution of firmware 134/kill firmware 134. In some embodiments, one or more address ranges are allocated to firmware 134 for memory-mapped input/output (MMIO) operations with respect to peripheral device 130, but sandbox 126 may prevent firmware 134 from accessing MMIO address ranges corresponding to other devices. Similarly, in some embodiments, sandbox 126 may permit peripheral device 130 to access memory address ranges allocated to firmware 134 via direct memory access (DMA) operations, but bar peripheral device 130 from accessing address ranges external those allocated to firmware 134.

As will be discussed below with respect to FIGS. 3A and 3B, in some embodiments, sandbox 126 further includes executing firmware 134 in application mode (or user mode). As used herein, the term "application mode" (or user mode) refers to a mode of execution in which a processor, such as CPU 110, executes an application (i.e., process) with restricted privileges. For example, in x86 processors, this mode is referred to as Ring 3. In such a mode, a process may be barred from executing particular instruction set architecture (ISA) defined instructions such as x86's writeback-and-invalidate-cache instruction. The processor may also bar direct access to particular hardware and/or restrict the application to accessing "application space," which refers to regions of memory allocated to applications executing in application mode. Examples applications executing in application mode may include, for example, word processing applications, web browsers, mail clients, or other user applications. For security reasons, most applications typically run as in application mode. In contrast, "kernel mode" (or system mode) refers to a mode in which a processor, such as CPU 110, executes an application with unrestricted privileges. For example, in x86 processor, this mode is referred to as Ring 0. Kernel mode is typically used for applications responsible for system management such as bootloaders (such as bootloader 124), operating system kernels, drivers, hypervisors, etc. The term "kernel space" refers to restricted regions of memory that can only be accessed by applications executing in kernel mode—in some embodiments, kernel-mode applications may also be restricted from accessing application-space regions of memory.

As CPU 110 may execute firmware 134 and bootloader 124 in different modes (i.e., application mode and kernel mode, respectively) in various embodiments, sandbox 126 facilitates communication between firmware 134 and bootloader 124, but restricts what and how communications occur. As will be discussed below with respect to FIG. 3A, bootloader 124 may support multiple protocols (e.g., thirty different protocols) for communicating specific types of information, but sandbox 126 may allow firmware 134 to install and use only a small subset of the protocols (e.g., ten protocols). Still further, as firmware 134 may not be permitted to access kernel space and thus execute a call into bootloader 124 to cause it to perform a requested operation, firmware 134 may instead execute a call into a wrapper of sandbox 126, which executes a downcall (also referred to as a system call) to cause CPU 110 to execute bootloader 124 in kernel mode. Similarly, bootloader 124 may not be permitted to access application space and thus execute a call back into firmware 134 to cause it to perform a requested operation; instead, in some embodiments, bootloader 124 executes a call into sandbox 126, which executes an upcall (also referred to as a system return/exit) to cause CPU 110 to execute firmware 134. Also, when a downcall or an upcall occurs, in some embodiments, sandbox 126 clones data being passed from application space to kernel space or from kernel space to application space.

Figure 2:
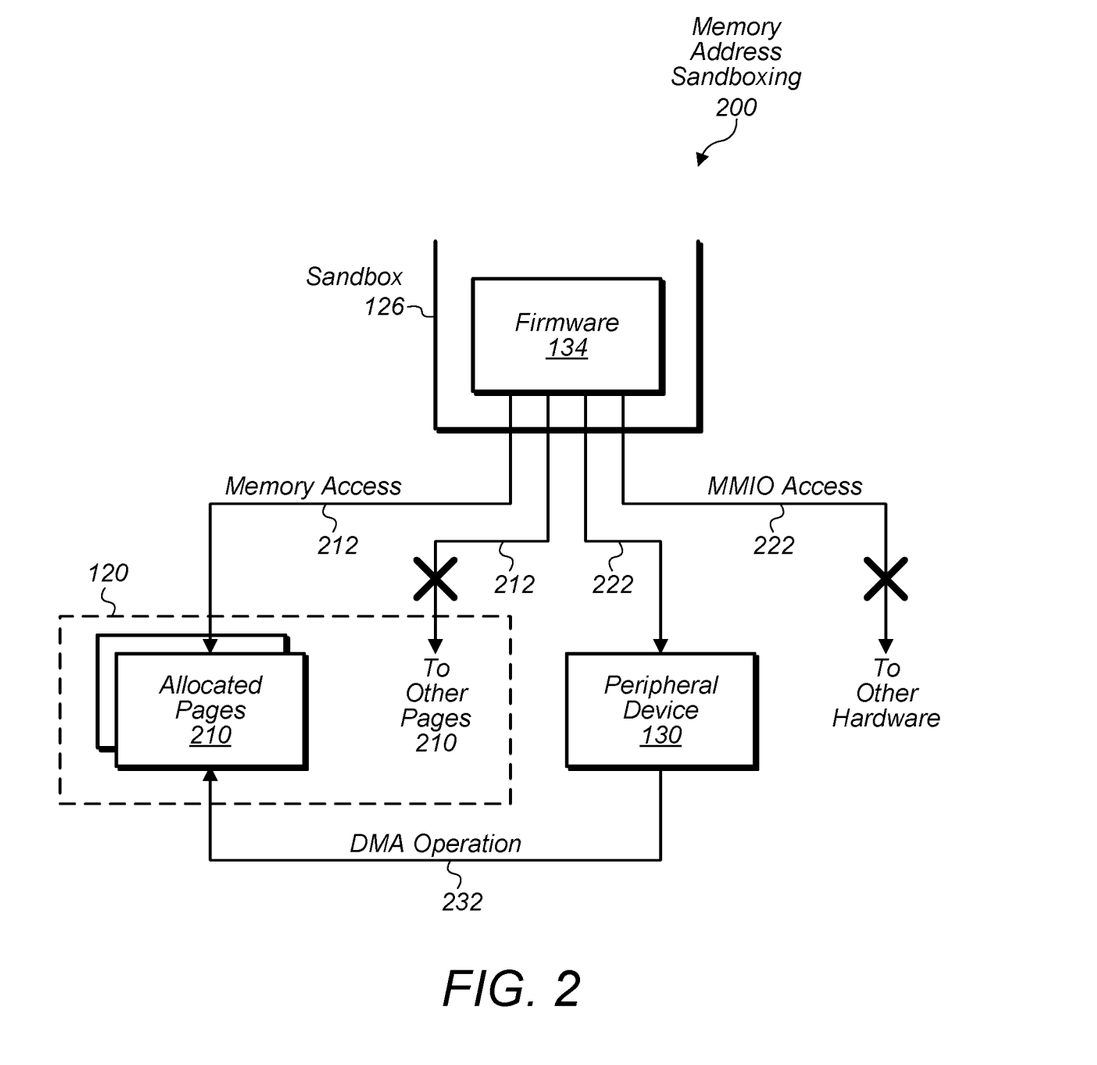
FIG. 2 is a block diagram illustrating an example of a sandbox that restricts memory accesses.

Turning now to FIG. 2, a block diagram of a memory address sandboxing 200 is depicted. As noted above, in some embodiments, sandbox 126 may restrict what memory addresses can be accessed by firmware 134 such as those pertaining to memory 120 and MMIO of various hardware devices.

When execution of firmware 134 is initiated, in the illustrated embodiment, bootloader 124 assigns one or more blocks/pages 210 of memory 120 for use by firmware 134. In various embodiments, sandbox 126 allows firmware 134 to perform memory accesses 212 (e.g., reads or writes) for address ranges corresponding to allocated pages 210, but prevents firmware 134 from performing memory accesses 212 to addresses belonging to other pages 210 that have not been allocated to firmware 134. Accordingly, if firmware 134 attempts a write to an address outside of its allocated pages 210, it may be prevented and, in some embodiments, killed. In some embodiments, pages 210 are also virtual—meaning they are accessible by specifying virtual addresses that are translated using a page table to corresponding physical addresses of memory 120. In such an embodiment, entries in the page table may be marked to indicate whether a given virtual-to-physical-address translation pertains to a page in application space (i.e., belongs to a process executing in application mode such as firmware 134) or pertains to a page in a kernel space (i.e., belongs to a process executing in kernel mode such as bootloader 124). Still further, in some embodiments, entries may be marked to indicate the relevant process for a given page (e.g., by specifying a process identifier (PID) associated with a page). In some embodiments, these page table indications may be used by sandbox 126 restrict firmware 134's access to addresses in memory 120. As an add precaution, bootloader 124 may also zero/clear memory for pages 210 being allocated to firmware 134.

In various embodiments, computing device 100 is configured to support MMIO in which one or more ranges of addresses are mapped to registers used to interface with underlying hardware other than memory 120. For example, peripheral device 130 may include one or more physical registers used to exchange data with device 130 and that are mapped to accessible addresses such that they appear as memory addresses to processes. In the illustrated embodiment, sandbox 126 permits firmware 134 to perform MMIO accesses (e.g., read or write operations) to addresses assigned to peripheral device 130 as it originated from device 130, but prevents firmware 134 from performing MMIO accesses 222 to address ranges associated with other hardware. Accordingly, if firmware 134 is a display driver and issues a request to access an MMIO address for a sound card, sandbox 126 may determine firmware 134 did not associated with the sound card and prevent the request and, in some embodiments, kill firmware 134.

In some embodiments, sandbox 126 may similarly restrict peripheral device 130 to accessing particular address ranges. For example, in the illustrated embodiment, peripheral device 130 is permitted to perform direct memory access (DMA) operations (e.g., reads and writes) with respect to address ranges of allocated pages 210A, but device 130 may be prevented from performing DMA operations with respect to other pages allocated to other processes. Accordingly, if peripheral device 130 requests a DMA operation for a page associated with bootloader 124, for example, the DMA request may be denied. In some embodiments, sandbox 126 may identify what pages 210 are accessible to peripheral device 130 via DMA based on the marked the page-table entries as noted above.

Figure 3A:
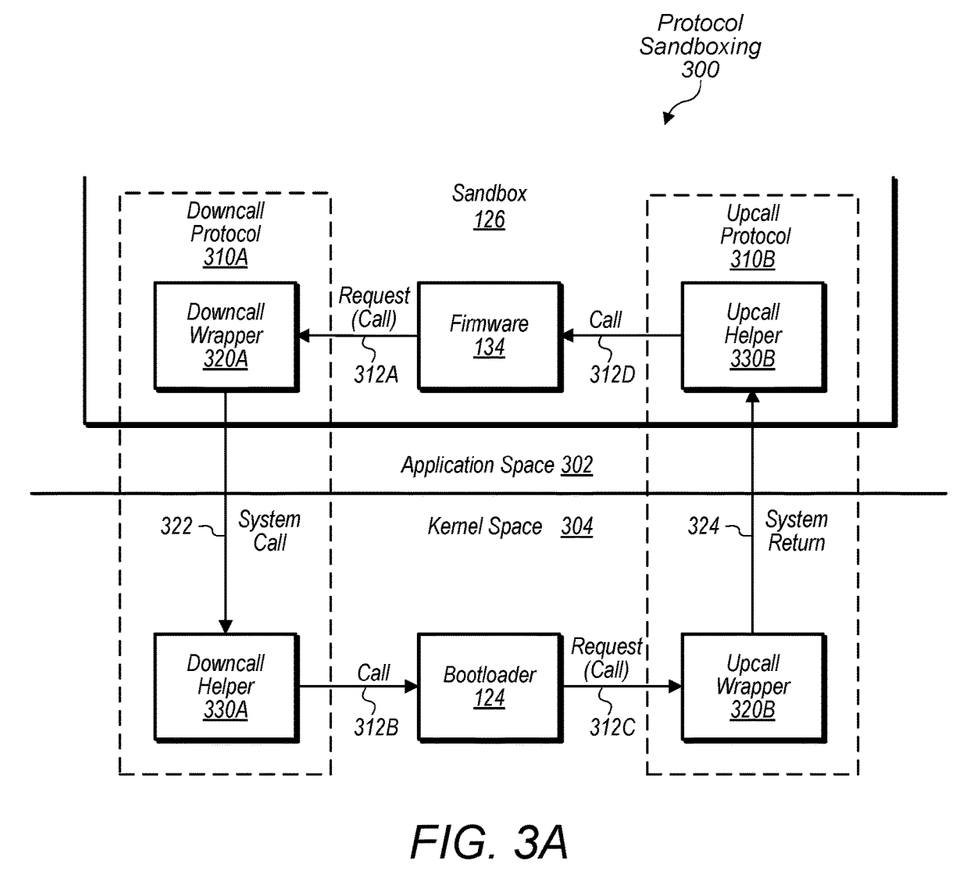
FIG. 3A is a block diagram illustrating an example of a sandbox that restricts interaction with a bootloader.

Turning now to FIG. 3A, a block diagram of protocol sandboxing 300 is depicted. As noted above, in various embodiment, firmware 134 may be prevented from directly interfacing with bootloader 124 as firmware 134 is not permitted to access kernel space. As a result, in the illustrated embodiment, sandbox 126 facilitates communications between firmware 134 in application space 302 and bootloader 124 in kernel space 304 through protocols 310 implemented using wrappers 320 and helpers 330.

Protocols 310, in various embodiments, are used to facilitate communication between various elements participating in the boot sequence of computing device 100 such as bootloader 124 and firmware 134. In general, a given protocol 310 may define a particular type (or types) of data be communicated such as defining what the data is and how it is structured. A given protocol 310 may also define how it is communicated such as identifying particular addresses/pointers where data is to be written and read. Examples of various protocols 310 may include ones to request page allocations, set UEFI variables, perform NVRAM writes, facilitate device interfacing (such as storage media protocols, draw-to-screen protocols, and reading and writing PCIe configurations), etc. In some embodiments, protocols 310 implement protocols compliant with UEFI.

As noted above, to provide further security in some embodiments, sandbox 126 may restrict what protocols 310 are accessible to firmware 134. That is, bootloader 124 may support multiple protocols 310, but sandbox 126 may permit firmware 134 to only install and use a subset of protocols 310 relevant to what device 130's intended use. For example, if firmware 134 is a graphics driver, sandbox 126 may prevent it from importing a protocol pertaining to a network interfacing card. In various embodiments, sandbox 126 may include a policy that it evaluates in order to determine what protocols 310 should be made accessible to firmware 134 and what protocols 310 should be barred. Still further, when a permitted protocol 310 is installed and used, firmware 134 is not permitted to directly interact with processes associated with kernel space 304 such as bootloader 124.

As such, downcall protocols 310A, in various embodiments, may be used to indirectly route communications from firmware 134 into kernel space 304—and, in some instances, on to bootloader 124. For example, firmware 134 may want to issue a request 312A to have bootloader 124 perform an operation such as allocating additional pages 210 in memory 120, setting an UEFI variable, etc. Rather than performing a call directly into bootloader 124 (which may include executing a call instruction or other control transfer instruction that impermissibly specifies a kernel-space address of bootloader 124), firmware 134, instead, makes a request 312A as a call into downcall wrapper 320A, which also resides in application space 302 and is restricted by sandbox 126. Downcall wrapper 320, in turn, may set an opcode pertaining to the specific operation being requested and invoke an included/wrapped system call instruction (e.g., an x86 syscall or sysenter instruction) in order to perform a system call 322 into kernel space 304, where the call is handled by downcall helper 330A being executed in kernel mode. In various embodiments, downcall helper 330A initially analyzes the opcode (and/or any other parameters associated with request 312A) to determine whether the operation being requested by firmware 134 is permissible. If the operation is permissible, downcall helper 330A may clone/copy any needed data from application space 302 into kernel space 304 and make a call 312B into bootloader 124 (e.g., by executing a call instruction or other control transfer instruction) to have bootloader 124 perform the requested operation.

As bootloader 124 may be barred from accessing application space 302 in some embodiments, upcall protocol 310B may indirectly route communications from bootloader 124 (or other kernel space processes) into application space 302 where firmware 134 resides. For example, bootloader 124 may want to convey a response to request 312A or want firmware 134 to have peripheral device 130 perform a particular operation. As such, bootloader 124 may make a request 312C by executing a call instruction into upcall wrapper 320B, which may include a system return instruction (e.g., an x86 sysret or sysexit instruction) executable to perform a system return 324 back into application 302. Before executing the system return instruction, upcall wrapper 320B may clone any data associated with request 312C into application space 302 from kernel space 304. Upon executing the system return instruction, CPU 110 may transition from executing wrapper 320A in kernel mode to executing helper 330B in application mode, where upcall helper 330B may handle the system return 324 and execute a call 312D into firmware 134 to have it service the request from bootloader 124.

Figure 3B:
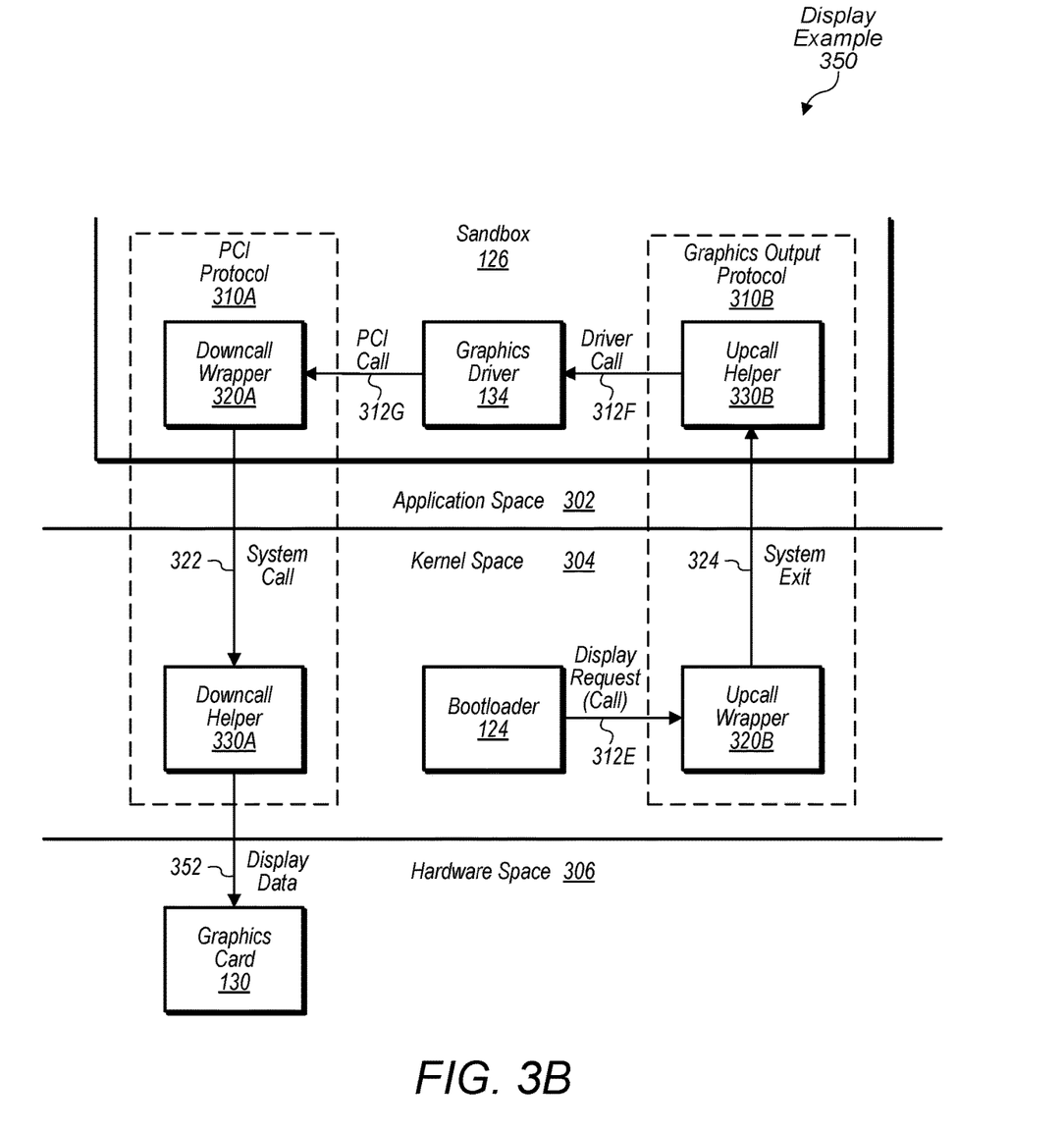
FIG. 3B is a block diagram illustrating an example of a sandbox that facilitates interaction between a graphics driver and a graphics card.

Turning now to FIG. 3B, a block diagram of display example 350 is depicted. In the illustrated embodiment, firmware 134 is a graphics driver that communicates with a graphics card 130 via a PCI protocol 310A. In example 350, bootloader 124 may want to have graphics card 130 render some display data 352 on a display of computing device 100 such as presenting a prompt to indicate that computing device 100 currently is booting and including a progress bar indicating where the computing device is in its boot sequence. As shown, bootloader 124 may make a request 312E as a call into an upcall wrapper 320B of a graphics output protocol 310B. Upcall wrapper 320B in turn may invoke a system exit 324 into a corresponding upcall helper 330B of protocol 310B, which may make a correspond call 312F into graphics driver 134. Graphics driver 134 may then attempt to service the request by making a PCI call 312G into a downcall wrapper 320A of a PCI protocol 310A. Downcall wrapper 320A may then invoke a system call 322 to cause CPU 110 to transition from executing downcall wrapper 320A in application mode to executing a downcall helper 330A in kernel mode. Downcall helper 330A may then analyze the system call 322 to determine whether the request being made (e.g., conveying data 352 to card 130) is permitted such as examining the opcode associated with the call, the origin of the call (i.e., that the call came from driver 134 originating from graphics card 130), etc. If the request being made using the system call 322 is permissible, helper 330A may then pass the display data 352 to graphics card 130 residing in hardware space 306. In response to receiving this data 352, graphics card 130 may render the corresponding prompt and output the prompt to a display of device 100.

In some embodiments, display example 350 may be implemented differently than shown. For example, in one embodiment, bootloader 124 may issue a request 312E to upcall wrapper 320B, which may perform a system exit 324 to upcall helper 330B as discussed above. When upcall helper 330B issues a driver call 312F to graphics driver 134, however, driver 134 may provide display data 352 directly to graphics card 130 by writing data 352 into card 130's MMIO address range as discussed above with respect to FIG. 2. In such an embodiment, driver 134's exchange with card 130 may be described as a "lateral call" as providing data 352 does not entail a system call back into kernel space 304.

Figures 4A, 4B:
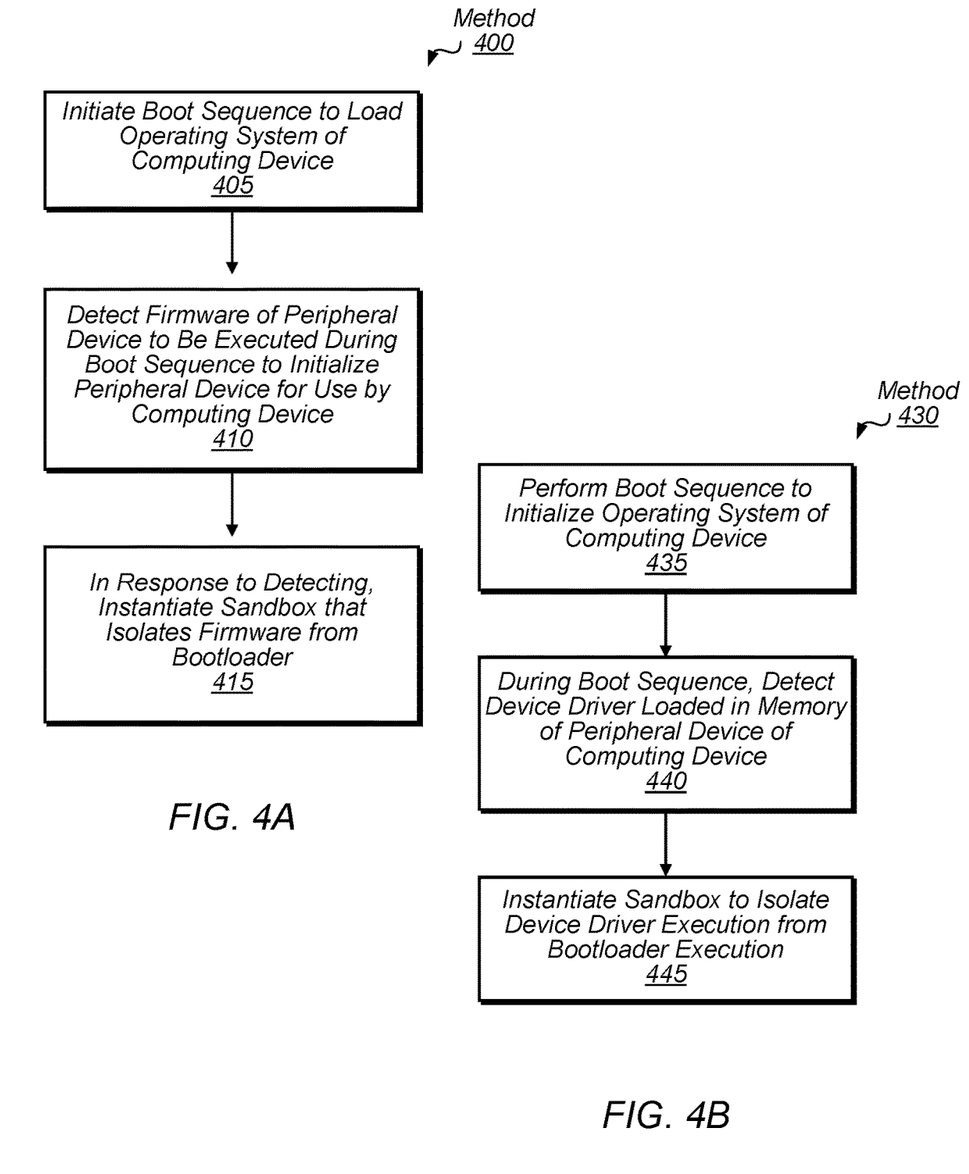
FIGS. 4A-4C are flow diagrams illustrating examples of methods for sandboxing.

Turning now to FIG. 4A, a flow diagram of a method 400 is depicted. Method 400 is one embodiment of a method for securely executing boot firmware. In various embodiments, method 400 is performed by a computing device executing a bootloader such as computing device 100. In many instances, performance of method 400 may make it more difficult to compromise a system during boot.

In step 405, a bootloader (e.g., bootloader 124) initiates a boot sequence to load an operating system (e.g., operating system 122) of the computing device.

In step 410, the bootloader detects firmware (e.g., firmware 134) of a peripheral device (e.g., device 130) to be executed during the boot sequence to initialize the peripheral device for use by the computing device.

In step 415, the bootloader instantiates, in response to the detecting, a sandbox (e.g., sandbox 126) that isolates the firmware from the bootloader. In various embodiments, the firmware is loaded from an option read-only memory (OROM) (e.g., OROM 132) included the peripheral device and executed during the boot sequence to initialize the peripheral device. In some embodiments, the bootloader assigns one or more memory address ranges to the firmware, and the sandbox restricts the firmware from accessing memory addresses that are not included in the assigned one or more memory address ranges. In some embodiments, the bootloader allocates one or more pages (e.g., pages 210) of memory to the firmware, and the one or more memory address ranges include ranges corresponding to the one or more pages. In some embodiments, the assigning includes assigning a memory-mapped input/output (MMIO) address range of the peripheral device to the firmware, and the restricting includes preventing the firmware from accessing an MMIO address of another peripheral device of the computing device. In some embodiments, the computing device services direct memory access (DMA) requests (e.g., for DMA operations 232) from the peripheral device that specify addresses within the one or more address ranges and prevents direct memory access (DMA) requests from the peripheral device that specify addresses outside of the one or more address ranges.

In some embodiments, the computing device executes the bootloader in a kernel mode in which the bootloader is executed with an unrestricted set of privileges and causes the firmware to be executed in an application mode such that the firmware executes with a restricted set of privileges. In some embodiments, the sandbox receives a request (e.g., request 312A) from the firmware to cause the bootloader to perform an operation and, in response to receiving the request, invokes a system call (e.g., system call 322) to cause a processor of the computing device to transition to executing the bootloader in the kernel mode. In such an embodiment, the bootloader performs the operation in response to a determination that the firmware is permitted to request the operation. In some embodiment, the sandbox receives a request (e.g., request 312C) from the bootloader to cause the firmware to perform an operation and, in response to receiving the request, invokes a system return (e.g., system return 324) to cause a processor of the computing device to transition to executing the firmware in the application mode. In some embodiments, the bootloader supports a plurality of Unified Extensible Firmware Interface (UEFI) protocols (e.g., protocols 310) usable to communicate data, and the sandbox restricts the firmware to using only a subset of the supported plurality of UEFI protocols.

Turning now to FIG. 4B, a flow diagram of a method 430 is depicted. Method 430 is another embodiment of a method for securely executing boot firmware. In various embodiments, method 430 is performed by a computing device executing a bootloader such as computing device 100. In many instances, performance of method 430 may make it more difficult to compromise a system during boot.

In step 435, a bootloader (e.g., bootloader 124) performs a boot sequence to initialize an operating system (e.g., operating system 122) of a computing device.

In step 440, the bootloader detects, during the boot sequence, a device driver (e.g., included in or corresponding to firmware 134) loaded in a memory (e.g., OROM 132) of a peripheral device (e.g., peripheral device 130) of the computing device.

In step 445, the bootloader instantiates a sandbox (e.g., sandbox 126) to isolate execution of the device driver from execution of the bootloader. In some embodiments, the instantiating includes causing a processor (e.g., CPU 110) of the computing device to execute the device driver in an application mode in which the device driver executes with a restricted set of privileges. In some embodiments, the computing device receives, from the device driver, a request (e.g., request 312A) for the bootloader to perform an operation and, in response to the request executes a system call instruction (e.g., system call 322) to transition into a kernel mode in which the bootloader executes with an unrestricted set of privileges. In some embodiments, the instantiating includes assigning an address range of memory to the device driver (e.g., an address range of pages 210A or device 130) and preventing the device driver from accessing addresses outside of the assigned address range. In some embodiments, the assigned address range is virtual memory address range. In such an embodiment, the computer device receives a request (e.g., a memory access 212 or MMIO access 222) from the device driver to access a virtual memory address in the assigned address range and translates the virtual memory address to a physical memory address in a memory of the computing device.

Figure 4C:
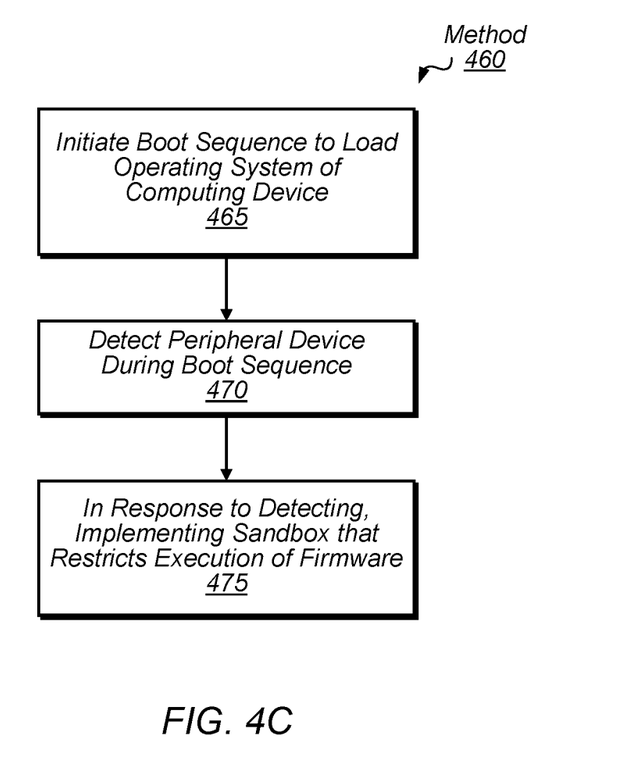

Turning now to FIG. 4C, a flow diagram of a method 460 is depicted. Method 460 is another embodiment of a method for securely executing boot firmware. In various embodiments, method 460 is performed by a computing device including a peripheral device including a memory having firmware stored therein such as computing device 100 including peripheral device 130. In many instances, performance of method 460 may make it more difficult to compromise a system during boot.

In step 465, a bootloader (e.g., bootloader 124) initiates a boot sequence to load an operating system (operating system 122) of the computing device.

In step 470, the bootloader detects the peripheral device during the boot sequence. In some embodiments, the peripheral device is a graphics card configured to implement Peripheral Component Interconnect Express (PCIe), and the firmware is included in an option read-only memory (OROM) of the graphics card.

In step 475, the bootloader implements, in response to the detecting, a sandbox (e.g., sandbox 126) that restricts execution of the firmware. In some embodiments, the implementing includes restricting execution of the firmware by assigning an address range of memory to the firmware (e.g., an address range corresponding to allocated pages 210 or an MMIO address range for peripheral device 130) and determining that the firmware is attempting to accessing a memory address external to the assigned address range, and based on the determining, killing execution of the firmware. In some embodiments, the implementing includes receiving, from the firmware, a request (e.g., PCI call 312G) to convey data to the peripheral device, determining that the firmware originated from the memory in the peripheral device, and, in response to the determining, conveying the data (e.g., display data 352) to the peripheral device. In some embodiments, the implementing includes causing the processor to execute a system call instruction (e.g., system call 322) in response to a request (e.g. request 312A) from the firmware to have the bootloader perform an operation, and in response to execution of the system call instruction, transitioning into a kernel mode to assess whether the firmware is permitted to request performance of the operation.

Exemplary Computer System

Figure 5:
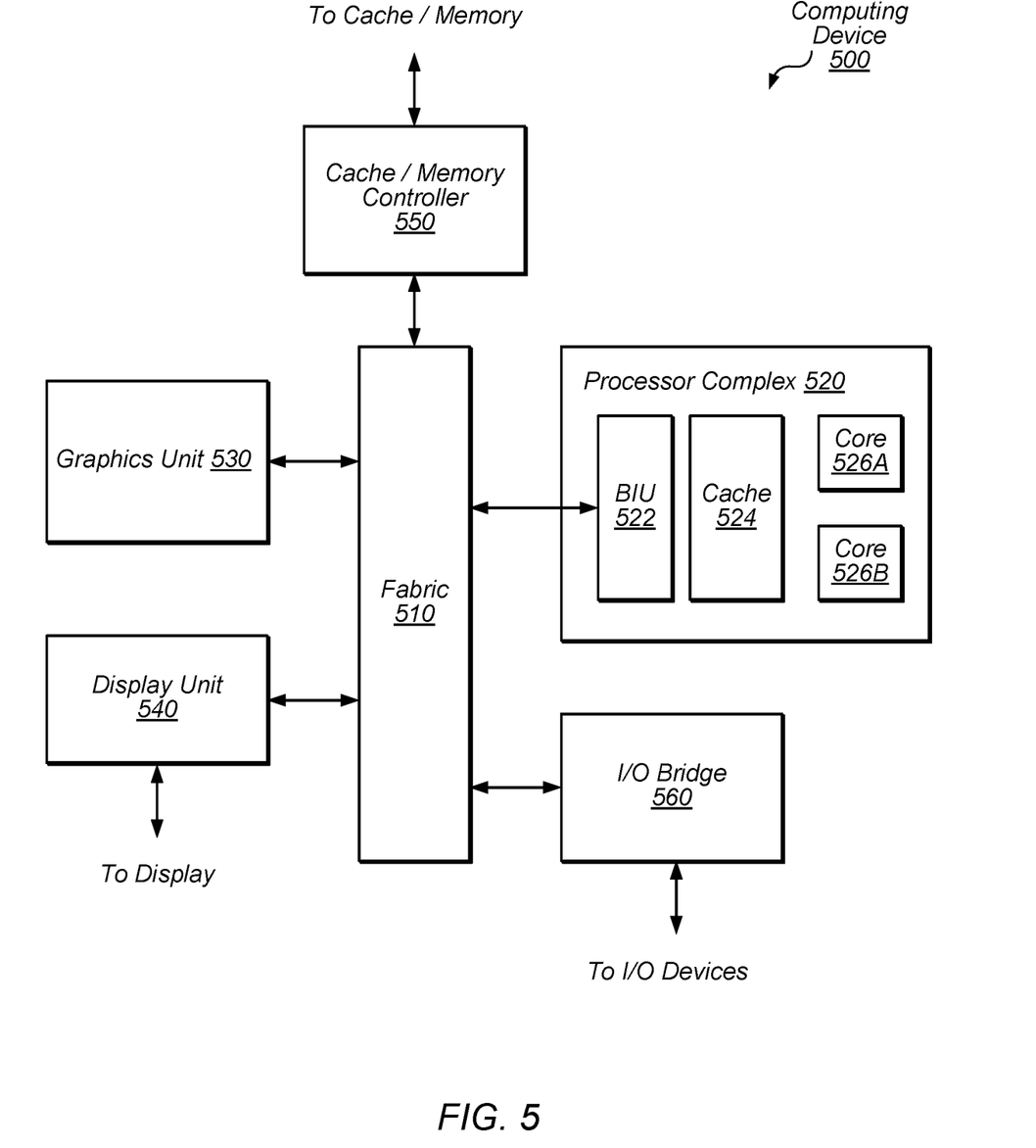
FIG. 5 is a block diagram illustrating an exemplary computing device.

Turning now to FIG. 5, a block diagram illustrating an exemplary embodiment of a computing device 500, which may implement functionality of computing device 100, is shown. Device 500 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 500 includes fabric 510, processor complex 520, graphics unit 530, display unit 540, cache/memory controller 550, input/output (I/O) bridge 560. In some embodiments, elements of device 500 may be included within a system on a chip (SOC).

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA), which may include operating system instructions and user application instructions. In some embodiments, complex 520 may implement CPU 110 discussed above. These instructions may be stored in computer readable medium such as a memory coupled to memory controller 550 discussed below.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images. In some embodiments, graphics unit 530 may be correspond to peripheral device 130.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 520 to cause device 500 to perform functionality described herein. In some embodiments, this memory may correspond to memory 120 discussed above.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a computing device to cause the computing device to perform operations comprising:
   initiating, by a bootloader, a boot sequence to load an operating system of the computing device;
   detecting, by the bootloader, a peripheral device inserted into the computing device, wherein the peripheral device has firmware to be executed during the boot sequence to initialize the peripheral device for use by the computing device;
   in response to the detecting, instantiating, by the bootloader, a sandbox that isolates the firmware from the bootloader;
   receiving, at a wrapper of the sandbox, a request from the firmware to have the bootloader perform an operation; and
   in response to the request, issuing, by the wrapper, a system call to cause the bootloader to perform the operation.

2. The computer readable medium of claim 1, wherein the operations comprise:
   loading the firmware from an option read-only memory (OROM) included the peripheral device; and
   executing the firmware during the boot sequence to initialize the peripheral device.

3. The computer readable medium of claim 1, wherein the operations comprise:
   assigning, by the bootloader, one or more memory address ranges to the firmware; and
   restricting, by the sandbox, the firmware from accessing memory addresses that are not included in the assigned one or more memory address ranges.

4. The computer readable medium of claim 3, wherein the operations comprise:
   allocating, by the bootloader, one or more pages of memory to the firmware, wherein the one or more memory address ranges include ranges corresponding to the one or more pages.

5. The computer readable medium of claim 3, wherein the assigning includes assigning a memory-mapped input/output (MMIO) address range of the peripheral device to the firmware; and
   wherein the restricting includes preventing the firmware from accessing an MMIO address of another peripheral device of the computing device.

6. The computer readable medium of claim 1, wherein the operations comprise:
   assigning, by the bootloader, one or more memory address ranges to the firmware;
   servicing direct memory access (DMA) requests from the peripheral device that specify addresses within the one or more memory address ranges; and
   preventing DMA requests from the peripheral device that specify addresses outside of the one or more memory address ranges.

7. The computer readable medium of claim 1, wherein the operations comprise:
   executing the bootloader in a kernel mode in which the bootloader is executed with an unrestricted set of privileges; and
   wherein the instantiating includes causing the firmware to be executed in an application mode such that the firmware executes with a restricted set of privileges.

8. The computer readable medium of claim 7, wherein the operations comprise:
   performing, by the bootloader, the operation in response to a determination that the firmware is permitted to request the operation.

9. The computer readable medium of claim 7, wherein the operations comprise:
   receiving, by a second wrapper of the sandbox, a request from the bootloader to cause the firmware to perform an operation; and
   in response to receiving the request, invoking, by the second wrapper, a system return to cause a processor of the computing device to transition to executing the firmware in the application mode.

10. The computer readable medium of claim 1, wherein the bootloader supports a plurality of Unified Extensible Firmware Interface (UEFI) protocols usable to communicate data; and
    wherein the operations comprise:
       restricting, by the sandbox, the firmware to using only a subset of the supported plurality of UEFI protocols.

11. A method, comprising:
    performing, by a bootloader, a boot sequence to initialize an operating system of a computing device;
    during the boot sequence:
       detecting, by the bootloader, a device driver loaded in a memory of a peripheral device of the computing device;
       instantiating, by the bootloader, a sandbox to isolate execution of the device driver from execution of the bootloader;
       receiving, at a wrapper of the sandbox, a request from the device driver to have the bootloader perform an action;
       in response to the request, issuing, by the wrapper, a system call to cause the bootloader to perform the action; and
       in response to determining that the isolated device driver has requested an inappropriate action, the sandbox terminating execution of the device driver.

12. The method of claim 11, wherein the instantiating includes causing a processor of the computing device to execute the device driver in an application mode in which the device driver executes with a restricted set of privileges.

13. The method of claim 12, further comprising:
    the processor executing the system call to transition into a kernel mode in which the bootloader executes with an unrestricted set of privileges.

14. The method of claim 11, wherein the instantiating includes assigning an address range of memory to the device driver and preventing the device driver from accessing addresses outside of the assigned address range.

15. The method of claim 14, wherein the assigned address range is a virtual memory address range, and wherein the method further comprises:
    receiving, by the computing device, a request from the device driver to access a virtual memory address in the assigned address range; and
    translating, by the computing device, the virtual memory address to a physical memory address in a memory of the computing device.

16. A computing device, comprising:
    a peripheral device including a memory having firmware stored therein;
    a processor; and memory having program instructions stored therein that are executable by the processor to cause the computing device to perform operations including:
- initiating, by a bootloader, a boot sequence to load an operating system of the computing device;
- detecting, by the bootloader, the peripheral device during the boot sequence;
- in response to the detecting, implementing, by the bootloader, a sandbox that restricts execution of the firmware;
- receiving, at a wrapper of the sandbox, a request from the firmware to have the bootloader perform an operation; and
- in response to the request, issuing, by the wrapper, a system call to cause the bootloader to perform the operation.

17. The computing device of claim 16, wherein the implementing includes restricting execution of the firmware by:
- assigning an address range of memory to the firmware;
- determining that the firmware is attempting to access a memory address external to the assigned address range; and
- based on the determining, killing execution of the firmware.

18. The computing device of claim 16, wherein the implementing includes:
- receiving, from the firmware, a request to convey data to the peripheral device;
- determining that the firmware originated from the memory in the peripheral device; and
- in response to the determining, conveying the data to the peripheral device.

19. The computing device of claim 16, wherein the implementing includes:
- in response to the system call, transitioning into a kernel mode to assess whether the firmware is permitted to request performance of the operation.

20. The computing device of claim 16, wherein the peripheral device is a graphics card configured to implement Peripheral Component Interconnect Express (PCIe), and wherein the firmware is included in an option read-only memory (OROM) of the graphics card.

* * * * *